(12) United States Patent
Bain et al.

(10) Patent No.: US 7,203,306 B2
(45) Date of Patent: Apr. 10, 2007

(54) APPARATUS AND METHOD FOR PROVIDING SWITCHING AT A TELEPHONE CROSS-CONNECT

(75) Inventors: Douglas Edward Bain, Cincinnati, OH (US); David Frederick DiBiase, Warren, NJ (US); George Andrew Holz, Basking Ridge, NJ (US); Robert Ellis Richton, Madison, NJ (US)

(73) Assignee: Loopexpert Technologies, Inc., Bridgewater, NJ (US)

( * ) Notice: Subject to any disclaimer, the term of this patent is extended or adjusted under 35 U.S.C. 154(b) by 827 days.

(21) Appl. No.: 10/190,654

(22) Filed: Jul. 8, 2002

(65) Prior Publication Data

US 2004/0005049 A1 Jan. 8, 2004

(51) Int. Cl.
*H04M 3/00* (2006.01)
*H04M 5/00* (2006.01)

(52) U.S. Cl. .................... 379/306; 379/335
(58) Field of Classification Search ............. 379/333, 379/335, 413.04, 306
See application file for complete search history.

(56) References Cited

U.S. PATENT DOCUMENTS

| 5,912,960 | A | | 6/1999 | Sanford et al. |
| 6,038,303 | A | * | 3/2000 | Sanford et al. ........ 379/201.01 |
| 6,072,793 | A | | 6/2000 | Dunn et al. |

* cited by examiner

*Primary Examiner*—Curtis Kuntz
*Assistant Examiner*—Alexander Jamal
(74) *Attorney, Agent, or Firm*—DeMont & Breyer, LLC

(57) ABSTRACT

A cost-effective technique for inserting a switching module into a line pair of a local telecommunications network is disclosed. In particular, the illustrative embodiment does not replace a punch-down block at a cross-connect, but rather inserts the switching module between the modular connectors that are usually co-located with the punch-down block and that connect the cable pairs to the punch-down block. In other words, the illustrative embodiment provides for a technician to disconnect a pair of modular connectors and to insert a switching module between them, wherein the switching modules inputs and outputs are provided via modular connectors.

6 Claims, 13 Drawing Sheets

APPARATUS AND METHOD FOR PROVIDING SWITCHING AT A TELEPHONE CROSS-CONNECT

FIELD OF THE INVENTION

The present invention relates to telecommunications in general and, more particularly, to an apparatus and method to improve the reliability of, and provide efficient maintenance for, telephone outside plant.

BACKGROUND OF THE INVENTION

FIG. 1 depicts a schematic diagram of local telecommunication network 100 in the prior art, in which the network provides telecommunication service to a number of subscribers that are situated within a geographic region. The core of local telecommunication network 100 is central office 101, which comprises at least one switch. The switch or switches at central office 101 connect subscribers in a given area to the public switched telephone network. The public switched telephone network is not actually part of any local network, but is a collection of switches and specific paths called "trunks" that connect the switches. Typically, the switch at central office 101 is connected to the rest of local telecommunication network 100 through a main distributing frame (abbreviated MDF) to large-capacity cable forming the first transmission facility, commonly referred to as F1 cable, at the exchange end of what is known as the local loop.

Typically, F1 cable 111 contains 1200 cable pairs. The wire pairs, or line pairs, are made of copper and are twisted to minimize crosstalk. F1 cable 111 is connected to cross-connect 103-1. As defined in Newton's Telecom Dictionary, 17$^{th}$ Edition, a "cross-connect" is defined as a connection scheme between cabling runs, subsystems, and equipment using patch cords or jumpers that attach to connecting hardware on each end. At cross-connect 103-1, those 1200 pairs are separated into smaller units, with two cables containing 500 pairs each, represented by cable 112 and 113, and two other cables containing 100 pairs each, represented by cable 114 and 115. F2 cable 115 is connected to cross-connect 103-2. At cross-connect 103-2, those 100 pairs are separated into smaller units, with one cable containing 75 pairs, represented by cable 116, and one other cable containing 25 pairs, represented by cable 117. The final run, F3 cable 117, is connected to cross-connect 103-3. In other local networks, possibly different numbers of cross-connects and cables are used. It is common for facilities numbering as high as F8 to be used, even though illustrative local telecommunication network 100 uses only F1 through F3.

Also constituting local telecommunication network 100 are telephone 104-1 through 104-25, served by line pairs connected to cross-connect 103-3. A cross-connect, such as cross-connect 103-3, that is used to split out line pairs for individual telephones is also referred to as a drop service terminal or, simply, a service terminal. The telephone terminals are at the subscriber end of the local loop. A specific loop path spanning local telecommunication network 100 serves each subscriber.

Note that cable 112, 113, 114, and 116 are connected to other cross-connects not shown in FIG. 1. It is possible that each active line pair within each of cable 112, 113, 114, and 116 terminates eventually at a telephone terminal at the subscriber end of the particular local loop served by the cable.

The segment of a local loop between the central office and the first outside plant node, that node being represented in FIG. 1 by cross-connect 103-1, can comprise a physical pair of wires or can comprise a virtual feeder pair in the form of a digital loop carrier (DLC) time slot. Similarly, just as F1 cable 111 can use virtual pairs, subsequent distribution legs (i.e., F2 cable 115 and F3 cable 117) can, use virtual pairs as well. The segments of local loop extending beyond cross-connect 103-1 are generally called distribution pairs. The last segment of local loop before each of telephone 104-1 through 104-25 is called a drop pair, or simply a drop.

Differing terms are sometimes used to describe cross-connects, such as feeder-distribution interface (FDI), remote terminal, and serving terminal, depending on where the cross-connect is situated in the local loop and the format of the signal the cross-connect handles. In all cases, cross-connects are the same in that they are demarcation points at which one transmission segment ends and another begins. Furthermore, at a most fundamental, conceptual level, cross-connects are the same. Such a logical extension of concepts should also be extended to varying arrangements in which the virtual feeder or distribution (for example, in the form of a digital loop carrier or a fiber) may be used not only for the F1 cable, but for any facility or leg of a subscriber loop.

An efficient process of maintenance for local loops depends on the ability to test subscriber lines at any time without dispatching technicians. Typically the biggest source of expense is the labor cost associated with dispatching into the field to manually make cross-connections in the FDIs and remote and serving terminals. Worse yet, the work typically performed for a new line or maintenance change in the local loop plant requires line rearrangements. For a significant number of those rearrangements, errors will almost inevitably occur, either in the rearrangement itself or in one or more administrative database entries made due to those changes. Error creation introduces even more expense to correct the errors.

Regardless of the subscriber service, the ability to test at the time a customer calls to report a trouble or at any time is crucial for efficient maintenance. These tests must be performed quickly and ideally without dispatching a field technician. Speed is important so that at least some common problems can be diagnosed (and ideally repaired) while the subscriber is on the phone with a repair service agent. For example, a common problem occurs when a subscriber leaves his phone off-hook. This can occur when a subscriber with two phones connected to one line leaves one phone off-hook during a conversation to pick up his other phone and forgets to hang up the phone used originally. After some time of sounding the receiver off-hook signal, the serving central office times out and essentially disconnects the subscriber's line. When the subscriber later tries to make a call using the second phone that was properly hung up, unaware that the first line is still off-hook, the phone line is perceived as broken. This subscriber might then call customer service complaining that he is unable make a call. Test equipment currently in common use (e.g., the Mechanized Loop Test, or MLT, provided by Lucent Technologies to Bell operating companies, etc.) can detect the receiver-off-hook condition and the repair agent can remind the subscriber to check his other phone lines, knowing that receiver-off-hook is likely the problem. On such a call, no technician is dispatched; indeed, even the process of recording this trouble call can be skipped, although it is likely recorded for statistical purposes. As the preceding description shows, this trouble call is efficiently handled because test equipment, which is sophisticated enough to detect the receiver-offhook condition, can be switched onto any subscriber's line quickly and run tests while the subscriber is talking with a customer service agent. Such efficiency is vital to modern telephone system operations; service would no longer be affordable if such capabilities were unavailable.

Issues such as the one described above concern both testing (particularly centralized testing) and maintenance, as these two activities are inextricably intertwined within many telephone company operations.

Often, the problem the subscriber is having with her phone service is not as straightforward as, for example, a phone line being off-hook. There is occasionally something wrong with the local loop between the central office and the subscriber's telephone. While there are some repairs that can be effected remotely, usually the technician has to diagnose the problem, determine where along the line the problem is, and repair the problem (e.g., a physical break in the line, etc.). If the problem turns out to be a broken line, the technician can mend the actual break in the wire or can reconfigure the local loop so that the subscriber is assigned a new physical line. Ideally, only the specific segment between cross-connects or splices to where the problem has been localized is swapped out.

One issue with swapping out a line, for testing or re-provisioning purposes, is that the technician has to visit at least two places along the local loop for the subscriber. One place is the cross-connect or splice on the exchange side of the impairment, and the other place is the cross-connect or splice on the subscriber side of the impairment. The technician typically has to access a manual cross-connect box, depicted in FIG. 2 of the prior art. This box typically comprises mechanical connecting terminals called punch-down blocks. Line pairs on the exchange side are mechanically connected to one set of punchdown blocks, whereas line pairs on the subscriber side are mechanically connected to a second set of punchdown blocks. Each exchange-side line pair is then connected to the corresponding subscriber-side line pair by a jumper wire pair running from one punchdown block to the other. There is a plurality of exchange-side line pairs and a plurality of subscriber-side line pairs terminating at the box. Note that there are typically more line pairs provisioned through manual cross-connect panel 201 than are presently in use. The additional line pairs allow for growth and, in the example, for swapping out when needed. Furthermore, the number of exchange-side line pairs (i.e., 211-1 through 211-M) and subscriber-side line pairs (i.e., 212-1 through 212-N) can be different from each other (i.e., M and N can have different values).

Manual cross-connect boxes are relatively inexpensive because they are passive devices requiring no power source. They are easy to use, requiring relatively little training on the part of the technician. Furthermore, the practice of using jumper wires to connect one punchdown block to another significantly reduces confusion as different line pair combinations get rewired over time.

Disadvantageously, manual cross-connect boxes cannot be reconfigured remotely, requiring trips by the technician to each cross-connect that has to be reconfigured. Because of this inconvenience, tests and provisioning that ordinarily would be tried are possibly infeasible. Furthermore, a problem with reconfiguring manual cross-connect panel 201 is the possibility of technician error. Typically, there are dozens, if not hundreds, of line pairs at a cross-connect. Even though the wires are color-coded, it is possible that the technician swaps in the wrong wire pair or does not make a solid, durable splice. Again, consider that when swapping in a new line pair, the technician has a chance to make an error in two places: at the exchange-side of the impairment and at the subscriber-side of the impairment.

FIG. 3 depicts automated cross-connect matrix 301 of the prior art, which joins a plurality of exchange-side line pairs (i.e., 311-1 through 311-M) and a plurality of subscriber-side line pairs (i.e., 312-1 through 312-N). Sanford et. al. in U.S. Pat. No. 5,912,960 teach an apparatus and method that can be used to make an automated cross-connect. As in the case of manual cross-connect panel 201, there are typically more line pairs provisioned through automated cross-connect matrix 301 than are presently in use. The additional line pairs allow for growth and, in the example, for swapping out when needed. Furthermore, the number of exchange-side line pairs and subscriber-side line pairs can be different from each other (i.e., M and N can have different values).

Automated cross-connect matrix 301 represents an improvement over manual cross-connect 201, in that most reconfigurations can be performed without a technician having to make a trip or two to the local loop. Automated cross-connect matrix 301 is controlled from presumably a convenient location (e.g., the serving central office, etc.), so a swapping of one line pair for another can be performed conveniently in less time, probably with fewer errors and at lower labor cost.

However, automated cross-connect matrix 301 has some disadvantages. As a new cross-connect serving a new group of subscribers (e.g., new housing development, new office park, etc.), automated cross-connect matrix 301 can represent a significant initial investment cost. The cross-connect can conceivably join any exchange-side line pair with any subscriber-side line pair, requiring a relay or switch for each pair combination, making automated cross-connect matrix 301 more expensive than manual cross-connect panel 201. As a, replacement cross-connect to an existing manual cross-connect, installing automated cross-connect matrix 301 can result in significant downtime. Line pairs serving subscribers have to be disconnected from the existing cross-connect, the existing cross-connect has to be removed, the new cross-connect has to be installed, and the line pairs have to be reconnected into the new cross-connect. Finally, it is often sufficient to automate a portion of the line pairs at a cross-connect, such that installing automated cross-connect matrix 301 would be excessive for serving the actual need.

There exists a need for a practical automating of re-mapping the pair connectivity of some or all of the line pairs within a local telecommunication network. Specifically, a need exists for the convenience, speed, reduced likelihood of errors associated with automating line pairs at a cross-connect in a local loop without the expense, downtime, and lack of scalability of the automated solutions in the prior art.

SUMMARY OF THE INVENTION

The present invention provides a cost-effective technique for inserting a switching module into a line pair of a local telecommunications network. In particular, the illustrative embodiment does not replace a punch-down block at a cross-connect, but rather inserts the switching module between the ubiquitous modular connectors that are usually co-located with the punch-down block and that connect the cable pairs to the punch-down block. In other words, the illustrative embodiment provides for a technician to disconnect a pair of modular connectors and to insert a switching module between them, wherein the switching modules inputs and outputs are provided via modular connectors.

This augments the cross-connect and overall local telecommunication network by providing a technician convenience, speed, and reduced likelihood of errors in reconfiguring line pairs within the local telecommunication network.

A plurality of switching modules can be introduced at a manual cross-connect to introduce a more scalable and more economical switching capability than is typically achieved by swapping out the manual cross-connect for an automated cross-connect. The present invention allows the network planner to decide to augment one pair unit, some pair units, or all pair units present at a cross-connect.

The illustrative embodiment of the present invention comprises: a first N-pair modular connector for joining a first plurality of line pairs to a corresponding plurality of exchange-side line pairs; a second N-pair modular connector for joining a second plurality of line pairs to a corresponding plurality of subscriber-side line pairs; a controller responsive to a first control signal received through said first plurality of line pairs for establishing switching configurations; and a switch for configuring a specified line pair within said first plurality of line pairs relative to another specified line pair within said second plurality of line pairs based on stimuli from said controller, wherein said first N-pair modular connector mates with at least one of an MS-squared connector, a 710 connector, and a single-side mechanical copper connector, and N is a positive integer.

DETAILED DESCRIPTION

Figure 1:
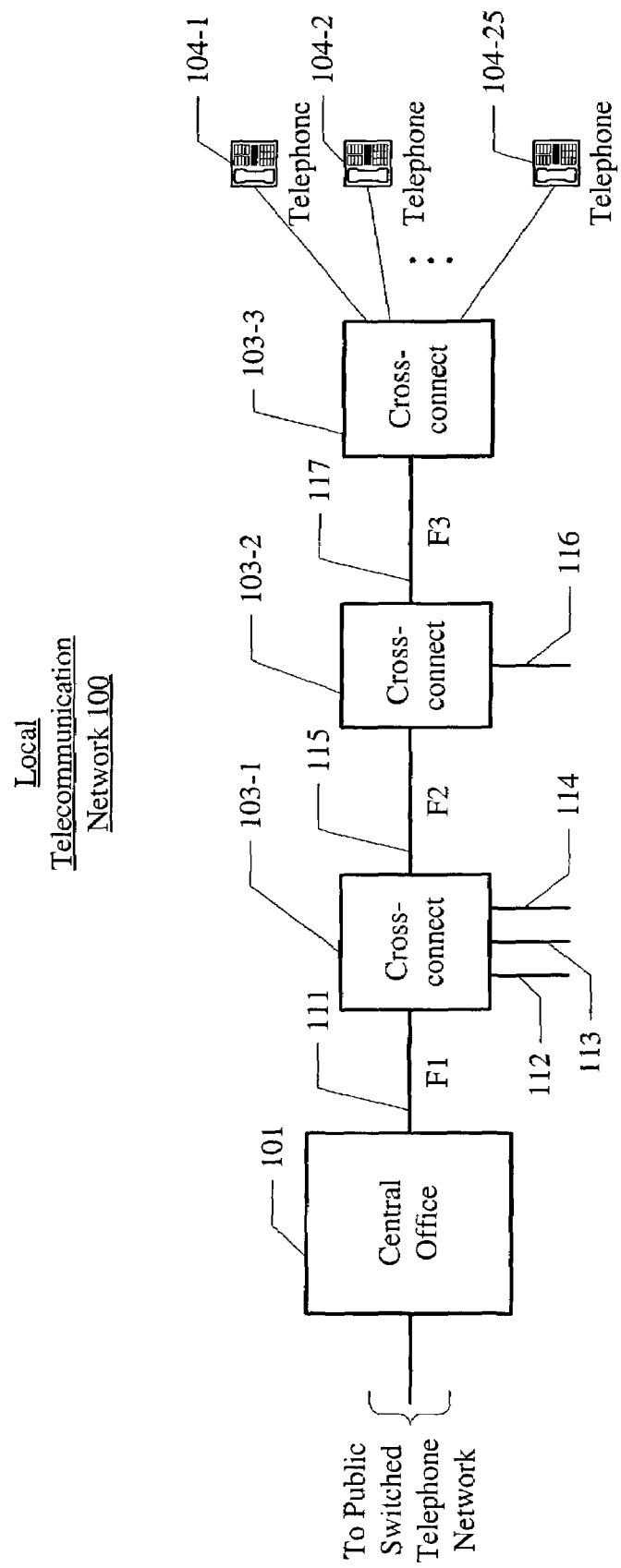
FIG. 1 depicts a block diagram of local telecommunication network 100 in accordance with the prior art.
Figure 2:
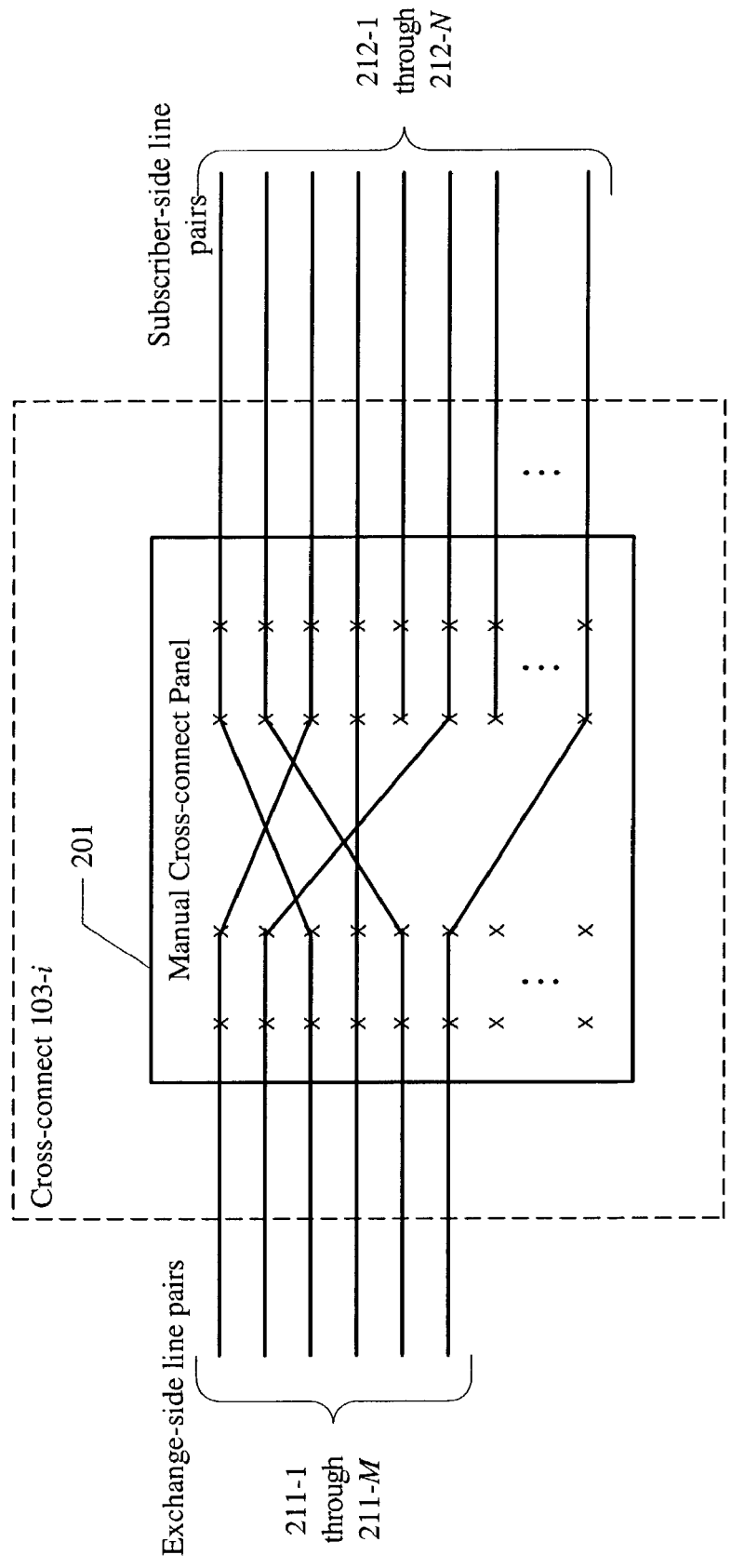
FIG. 2 depicts a block diagram of a manual cross-connect in accordance with the prior art.
Figure 3:
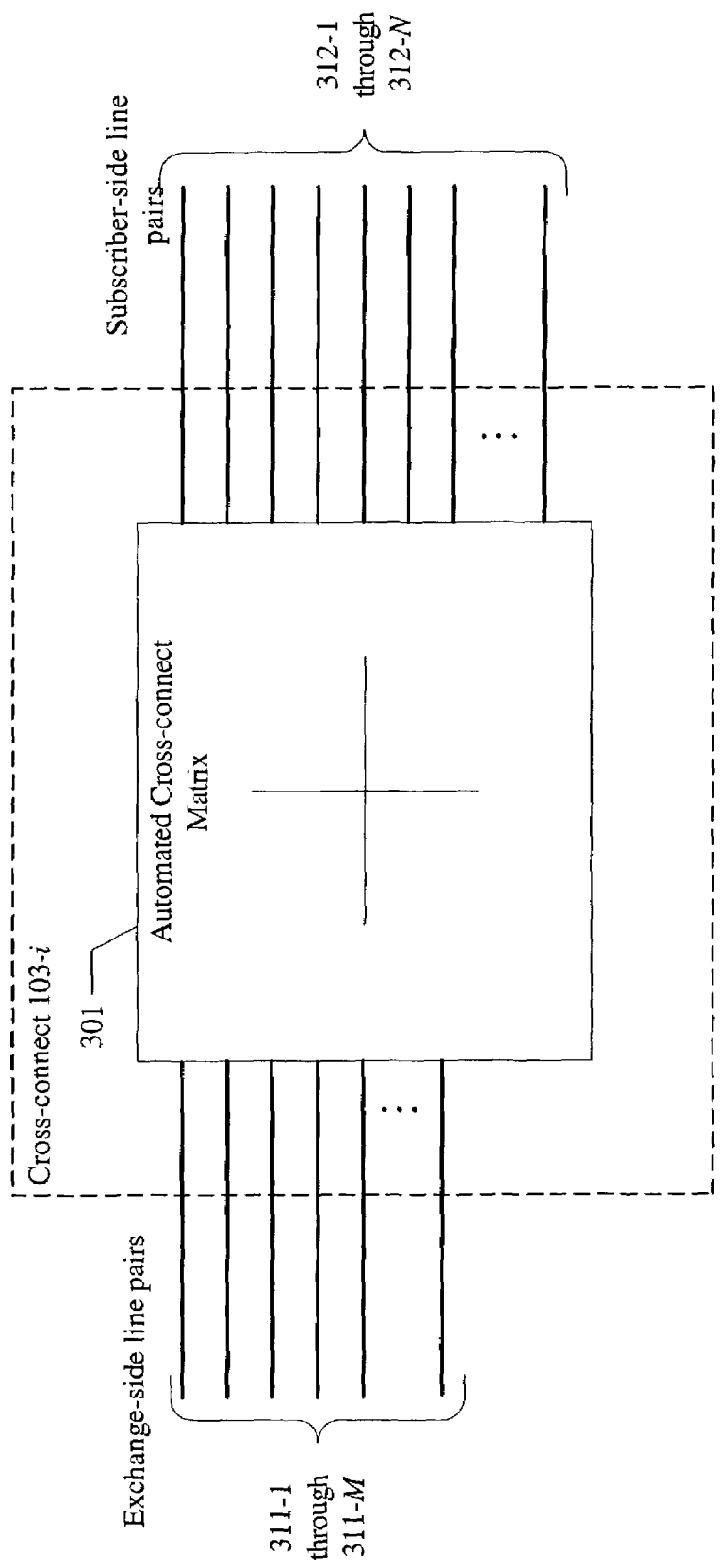
FIG. 3 depicts a block diagram of an automated cross-connect in accordance with the prior art.
Figure 4:
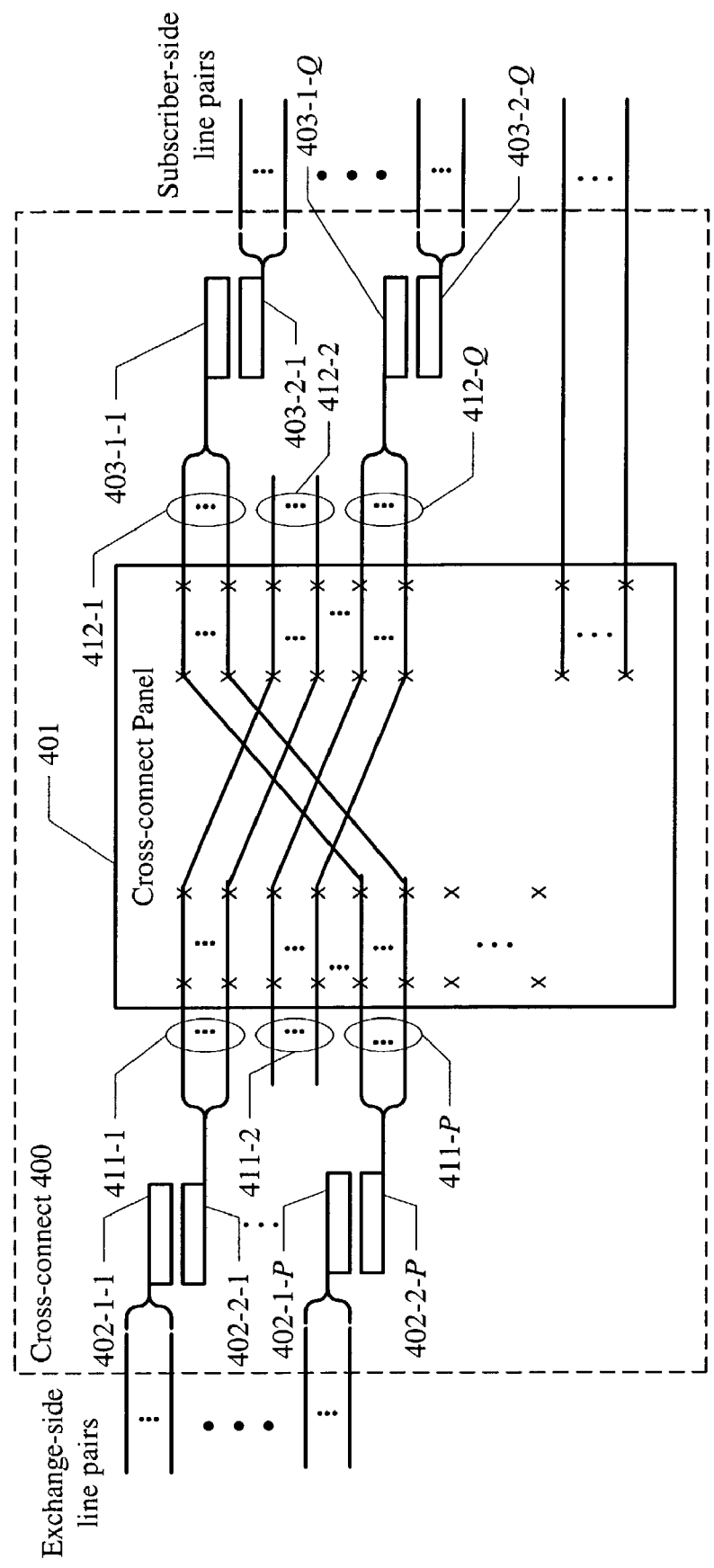
FIG. 4 depicts a block diagram of a cross-connect with pair unit connectors.

FIG. 4 depicts a block diagram of the salient components of cross-connect 400 in accordance with the illustrative embodiment. When cross-connect 400 is outdoors, it typically comprises a cabinet (not shown) that is used to house equipment that joins a plurality of exchange-side line pairs to a plurality of subscriber-side line pairs. In contrast, when cross-connect 400 is indoors, it often does not comprise a cabinet, but appears on a wall within a wiring closet in a building.

In either case, cross-connect 400 also comprises connection media, in this case cross-connect panel 401, which in turn comprises one or more punch-down blocks and jumper wires. It is well-known to those skilled in the art how to make and use cross-connect 400. Although a manual cross-connect is shown in FIG. 4, it will be clear to those skilled in the art, after reading this specification, that cross-connect 400 can also comprise an automated cross-connect.

In accordance with the illustrative embodiment, there are more line pairs provisioned through cross-connect 400 than are intended to be immediately in use. The additional line pairs allow for growth and for swapping out defective line pairs when necessary. Furthermore, it will be clear to those skilled in the art that the number of exchange-side line pairs and the number of subscriber-side line pairs can be different.

The line pairs terminating at a cross-connect are grouped together hierarchically. A clustering of individual line pairs forms a pair unit. There are 25 line pairs per pair unit. It will be clear to those skilled in the art, however, how to make and use pair units comprising a different number of line pairs than 25. For example, other common groupings are 5 line pairs per pair unit and 10 line pairs per pair unit. Pair unit 411-j, for j=1 to P, exists on the exchange-side of cross-connect cabinet 401. Pair unit 412-k, for k=1 to Q, exists on the subscriber-side of cross-connect cabinet 401. It will be clear to those skilled in the art how to configure cross-connect 400 with a different number of pair units on the exchange side than on the subscriber side (i.e., P can, but does not necessarily need to equal Q).

Cross-connect panel 401 is the means by which an exchange-side pair is joined to a subscriber-side pair. As shown in FIG. 4, pair unit 411-1 is connected by cross-connect cabinet 401 to pair unit 412-2. Similarly, pair unit 411-2 is connected by cross-connect 401 to pair unit 412-Q, and pair unit 411-P is connected by cross-connect 401 to pair unit 412-1. All active line pairs on the exchange side are wired to active line pairs on the subscriber side.

Pair unit 411-j is electrically connected within cross-connect 400 to pair unit connector 402-2-j and to cross-connect panel, 401, for j=1 to P. Each pair unit connector 402-2-j, in turn, is attached to pair unit connector 402-1-j, which is electrically connected to a corresponding exchange-side pair unit.

On the subscriber side, pair unit 412-k is electrically connected within cross-connect 400 to pair unit connector 403-1-k and to cross-connect panel 401, for j=1 to Q. Each pair unit connector 403-1-k, in turn, is attached to pair unit connector 403-2-k, which is electrically connected to a corresponding subscriber-side pair unit.

In the example of a 25-pair pair unit, each of connector 402-1-j, 402-2-j, 403-1-k, and 403-2-k is generically referred to as a 25-pair modular connector. There are a few connector types that have become the industry standards. One type is the Dynatel 710 (pronounced "Dynatel seventen"), also known as 710, designed by Dynatel. A second type is the $MS^2$ (pronounced "MS-squared"), also known as MS2, made by 3M Corporation. A third type is the single-side mechanical copper connector, made by AMP and Scotchlok. A modular connector pair (e.g., 402-1-i and 402-2-i, etc.) comprises a male connector and a female connector that are designed to fit together to form a secure mechanical and electrical connection. The modular connectors are present for pair units within cross-connect cabinet 103-i.

Figure 5:
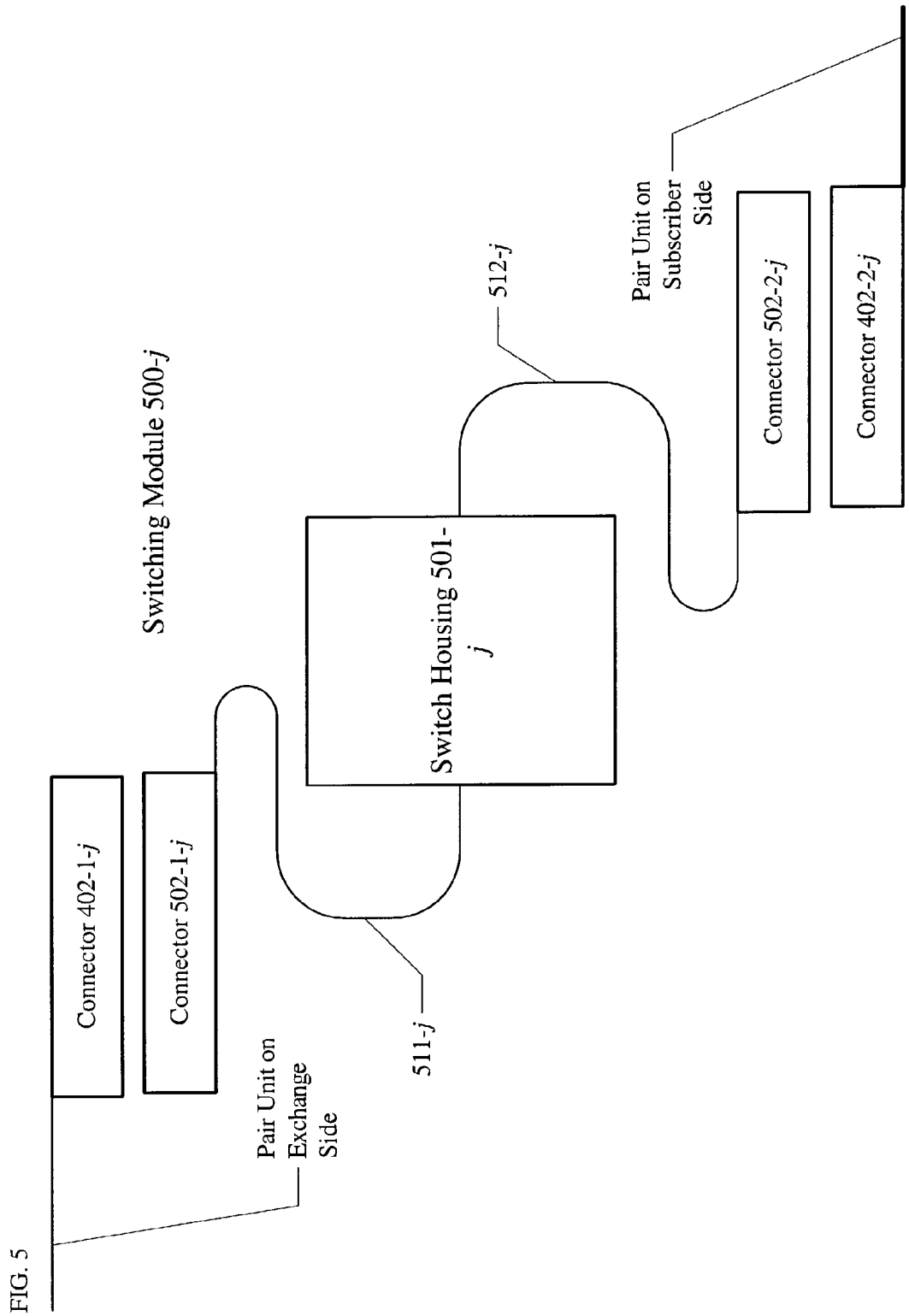
FIG. 5 depicts a block diagram of the first illustrative embodiment of the present invention.

FIG. 5 depicts a block diagram of the salient components of the first illustrative embodiment of the present invention. Switching module 500-j comprises switch housing 501-j, connector 502-1-j, and connector 502-2-j. Switch housing 501-j is where the switching function resides, which is electrically connected to connector 502-1-j and 502-2-j in well-known fashion via pair unit 511-j and 512-j, respectively, and will be discussed later. Connector 502-1-j is designed to attach to connector 402-1-j in a male/female configuration as described earlier. Connector 502-2-j is designed to attach to connector 402-2-j in a male/female configuration as described earlier. Switching module 500-j handles a cable pair unit from each of the two sides. It will be clear to those skilled in the art how to make and use suitable connectors, such as the connector models identified earlier. It will be also clear to those skilled in the art that switching module 500-j can be used on the subscriber side of a cross-connect only, on the exchange side of a cross-connect only, or on both sides of a cross-connect. Furthermore, it will be clear to those skilled in the art that switching module 500-j can be used for some pair units and not for others associated with cross-connect 400.

Figure 6:
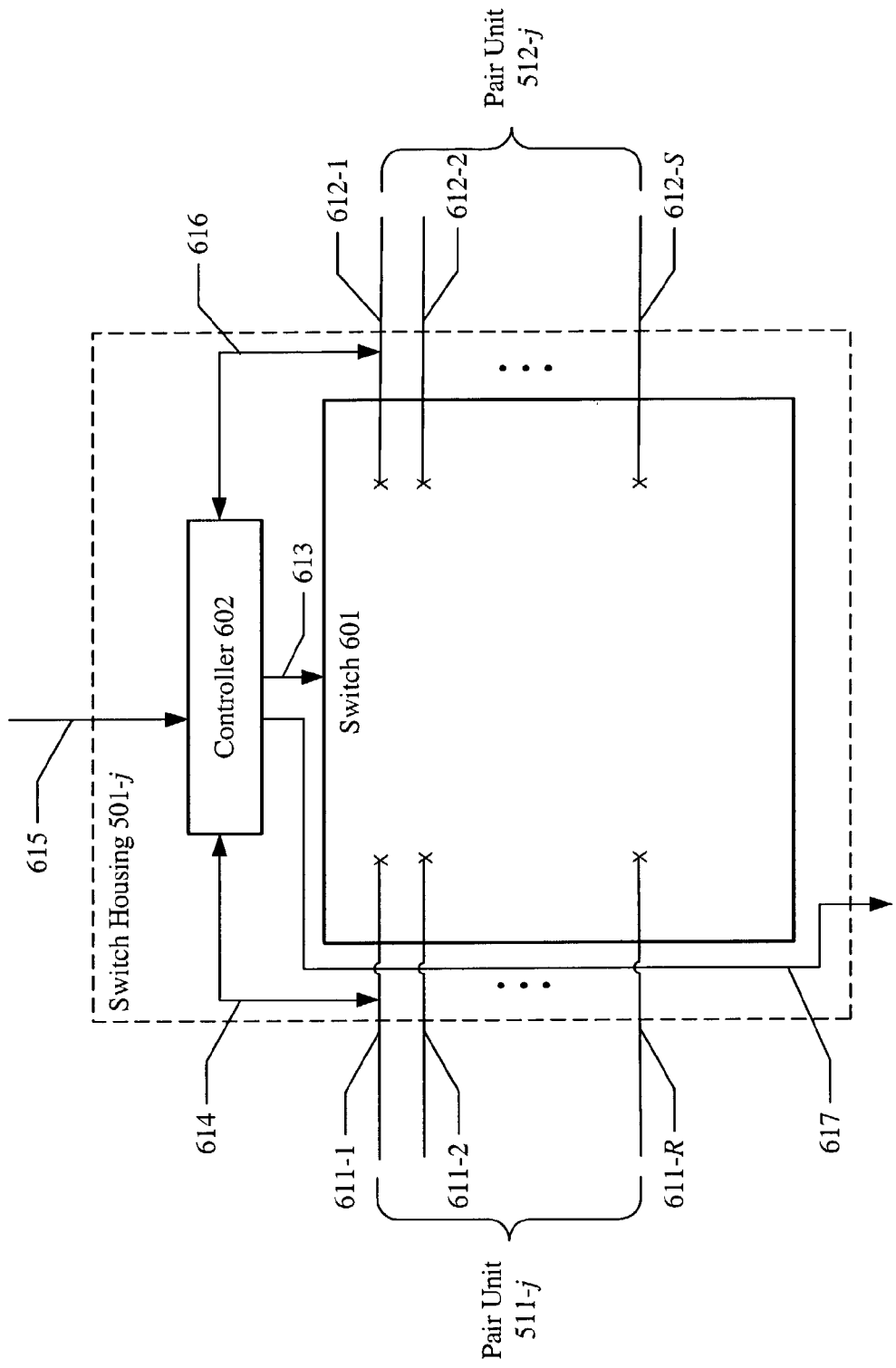
FIG. 6 depicts a block diagram of switch housing 501-j, as shown in FIG. 5, in accordance with the first illustrative embodiment of the present invention.

FIG. 6 depicts a block diagram of the salient components of switch housing 501-j, which comprises switch 601 and controller 602. Line pairs 611-g, for g=1 to R, constitute pair unit 511-j. Line pairs 612-h, for h=1 to S, constitute pair unit 512-j. Switch 601 serves to establish the correct loop path mapping between exchange-side line pairs 611-g, for g=1 to R, and line pairs to subscribers 612-h, for h=1 to S. Although, R and S are equal in the illustrative embodiment, it will be clear to those skilled in the art how to make and use a switch with a different number of lines on each terminating end of the switch (i.e., R≠S).

Switch 601 can control all of the line pairs or merely a non-empty, proper subset of the line pairs. Switch 601 can provide connectivity between exchange-side line pairs and subscriber-side line pairs in every combination, or switch 601 can provide a non-exhaustive set of connectivity, depending on what the particular application requires. Switch 601 can be built based on micro-electromechanical system (i.e., MEMS) technology or other technology. It will be clear to those skilled in the art how to make and use switch 601, controlled by controller 602.

Controller 602 accepts control signals from the technician or from technician-controlled operations, administration, maintenance, and provisioning (OAM&P) equipment. The control signals are used to properly configure switch 601 via path 613. The technician and OAM&P equipment can be situated at a convenient, centralized location within or near local telecommunication network 100 (e.g., near central office 101, etc.). The OAM&P equipment can send control signals along a dedicated line pair (e.g., 611-1, etc.) that controller 602 knows is used for control signaling. Controller 602 is configured to monitor via path 614 the control signal traffic on the dedicated control signaling line pair. It will be clear to those skilled in the art how to create and use control signaling to be used by controller 602. It will be also clear to those skilled in the art how to provision a specific line pair or pairs to be used for carrying control signals and how to monitor for control signals. Alternatively, controller 602 can receive control signals from a dedicated path other than line pair 611-g. Path 615 represents a dedicated path for control signaling. Path 615 can be implemented with an interface such as RS-232. It will be clear to those skilled in the art how to make and use a separate path for carrying control signals.

Controller 602 can also pass control signals further along local telecommunication network 100. This is necessary if the control signal intercepted by controller 602 is not intended for switch 601. Another scenario is where controller 602 needs to coordinate an action with one or more additional switching modules. The control signal can be passed along via path 616 using a line pair dedicated for control signaling purposes (e.g., line pair 612-1, etc.). Alternatively, the control signal can be passed along a separate control path, depicted in FIG. 6 as path 617. It will be also clear to those skilled in the art how to provision a specific line pair or pairs to be used for forwarding control signals. It will be clear to those skilled in the art how to make and use a separate control path for passing control signals.

Switch 601 and Controller 602 are nominally line-powered by one or more line pairs on the exchange side based on $-48V_{DC}$ voltage from central office 101. It will be clear to those skilled in the art how to line-power switch 601 and controller 602. Alternatively, switch 601 and controller 602 can draw power from a power supply local to host cross-connect 400. It will be clear to those skilled in the art how to power switch 601 and controller 602 locally.

Figure 7A:
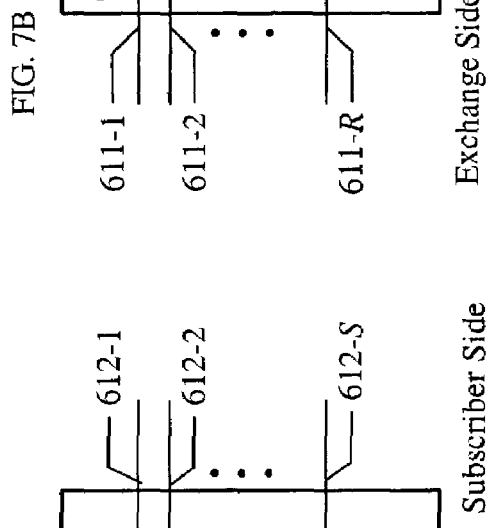
FIG. 7A depicts a block diagram of switch 601, as shown in FIG. 6, in accordance with the first mode of operation of the present invention.

FIG. 7A depicts the first mode of operation of the present invention. In the drawing, switch 601 initially has established a connection as shown by the dashed line between exchange-side line pair 611-1 and subscriber-side line pair 612-1. Upon receiving a command within a control signal, switch 601 reconfigures to connect line pair 611-1 to 612-2. This can apply to a situation where a technician has determined that line pair 612-1 is faulty and that 612-2 will be the line pair associated with the subscriber going forward.

Figure 7B:
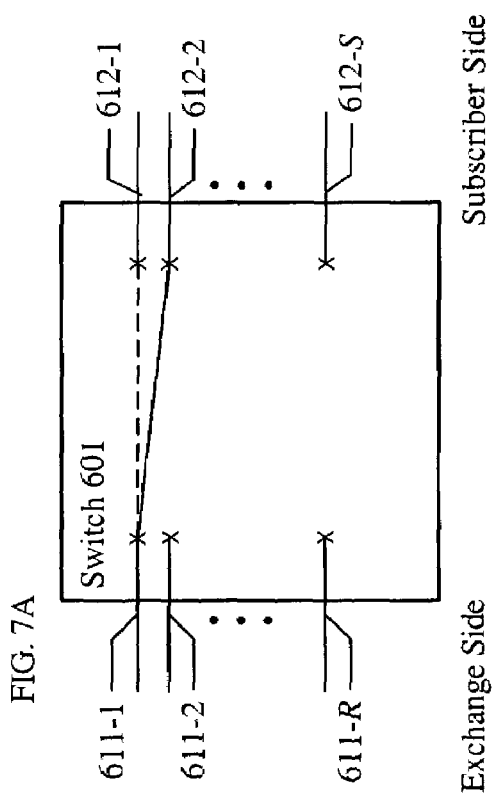
FIG. 7B depicts a block diagram of switch 601, as shown in FIG. 6, in accordance with the second mode of operation of the present invention.

FIG. 7B depicts the second mode of operation of the present invention. In the drawing, switch 601 initially has established a connection as shown by the dashed line between exchange-side line pair 611-1 and subscriber-side line pair 612-1. Upon receiving a command within a control signal, switch 601 opens the connection, essentially leaving line pair 611-1 not connected to anything (i.e., open-circuited). This can apply to a situation where a technician suspects that line pair 612-1 is short-circuited to itself. If the measured impedance on line 611-1 changes from a low or zero value to the correct open circuit value, this test will confirm or strongly suggest that line pair 612-1 is shorted.

Figure 7C:
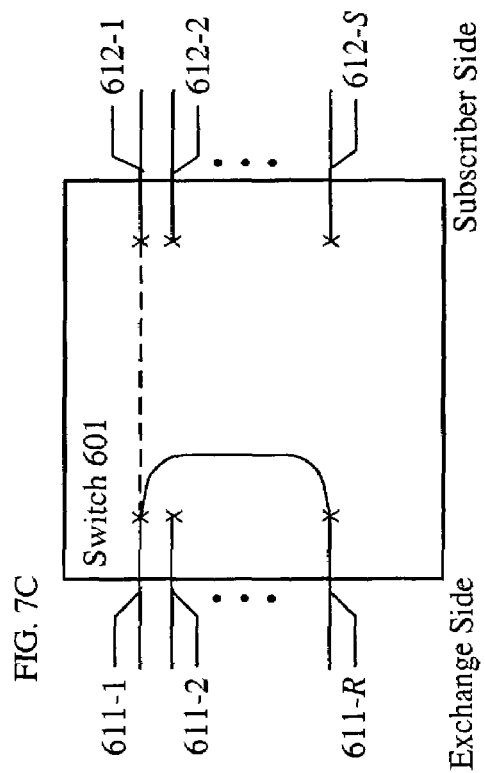
FIG. 7C depicts a block diagram of switch 601, as shown in FIG. 6, in accordance with the third mode of operation of the present invention.

FIG. 7C depicts the third mode of operation of the present invention. In the drawing, switch 601 initially has established a connection as shown by the dashed line between exchange-side line pair 611-1 and subscriber-side line pair 612-1. Upon receiving a command within a control signal, switch 601 crosses the connection from exchange-side line pair 611-1 back to another exchange-side line pair, line pair 611-R. Such a reconfiguring is useful for testing the overall characteristics of line pair 611-1 all the way back to the test equipment (e.g., equipment at central office 101, etc.).

Figure 8:
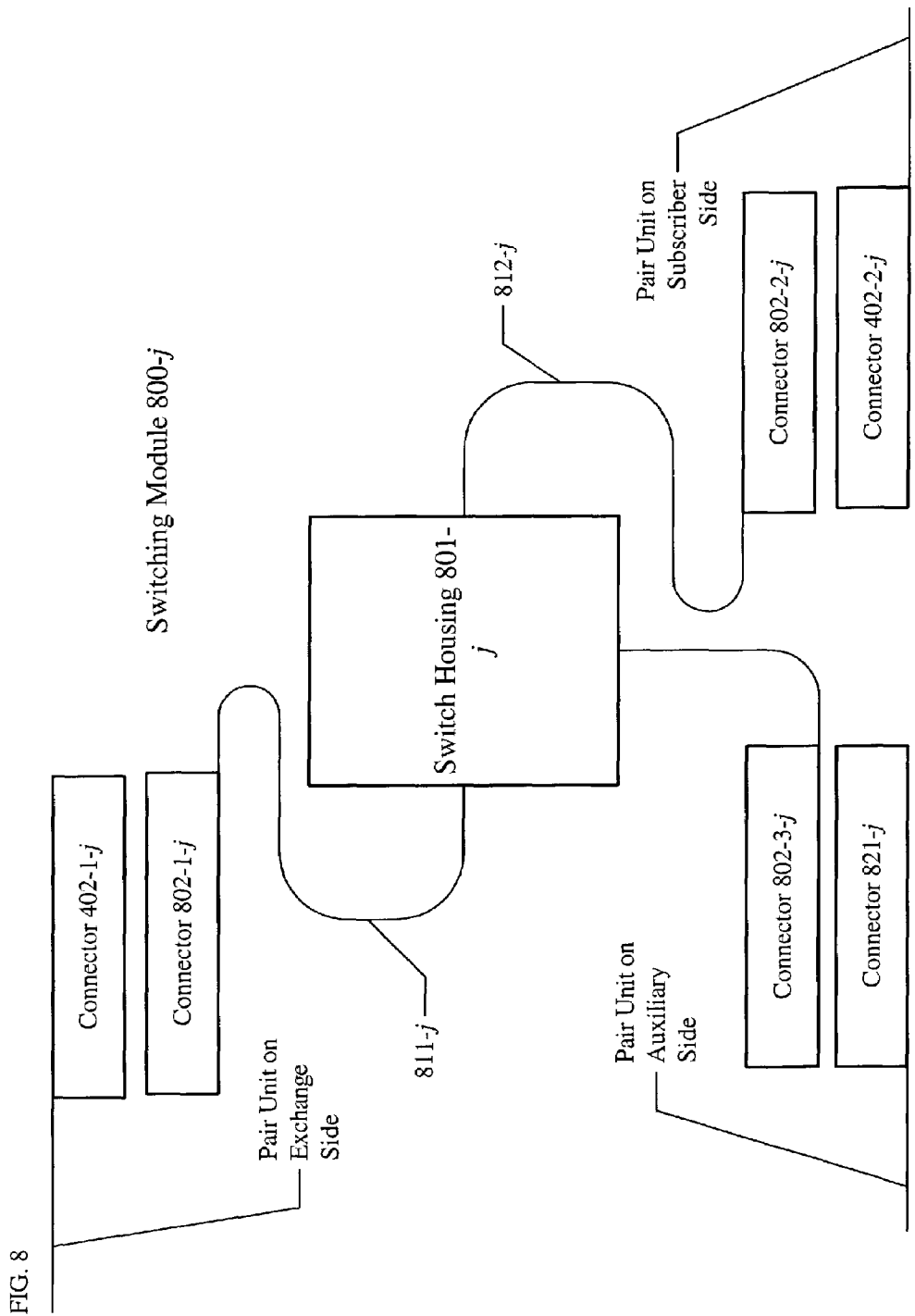
FIG. 8 depicts a block diagram of the second illustrative embodiment of the present invention.

FIG. 8 depicts the second illustrative embodiment of the present invention. Switching module 800-j comprises switch housing 801-j, connector 802-1-j, connector 802-2-j, and connector 802-3-j. Switch housing 801-j is where the switching function resides, which is electrically connected to connector 802-1-j, 802-2-j, and 802-3-j in well-known fashion via pair unit 811-j, 812-j, and 813-j, respectively, and will be discussed later. Connector 802-1-j is designed to attach to connector 402-1-j. Connector 802-2-j is designed to attach to connector 402-2-j. Connector 802-3-j is designed to attach to connector 821-j, which is associated with a technician-defined or network planner-defined auxiliary path (i.e., the "auxiliary side") in local telecommunication network 100. Switching module 800-j handles a cable pair unit from each of the three paths. It will be clear to those skilled in the art how to make and use suitable connectors, such as the connector models identified earlier. It will be also clear to those skilled in the art that switching module 800-j can be used on the subscriber side of a cross-connect only, on the exchange side of a cross-connect only, or on both sides of a cross-connect. Furthermore, it will be clear to those skilled in the art that switching module 800-j can be used for some pair units and not for others associated with cross-connect 400.

Figure 9:
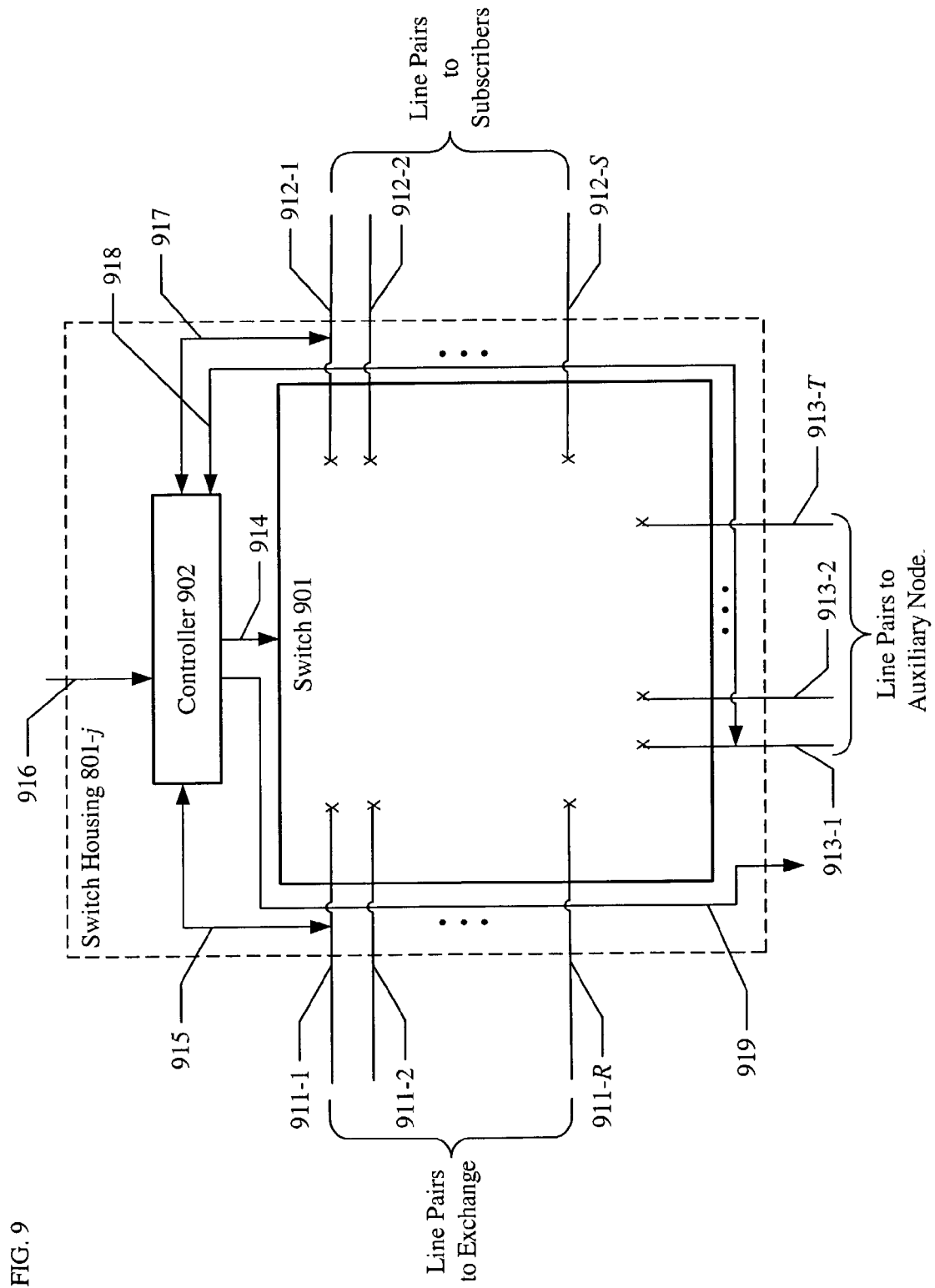
FIG. 9 depicts a block diagram of switch housing 801-j, as shown in FIG. 8, in accordance with the second illustrative embodiment of the present invention.

FIG. 9 depicts switch housing 801-j comprising switch 901 and controller 902. Line pairs 911-g, for g=1 to R, constitute pair unit 811-j. Line pairs 912-h, for h=1 to S, constitute pair unit 812-j. Line pairs 913-l, for l=1 to T, constitute pair unit 813-j. Switch 901 serves to establish the correct loop path mapping between exchange-side line pairs 911-g, for g=1 to R, and line pairs to subscribers 912-h, for h=1 to S. Furthermore, switch 901 provides connectivity between the third pair unit comprising line pairs 913-l, for l=1 to T, and the first two line pair units. Although R, S, and T are equal in the illustrative embodiment, it will be clear to those skilled in the art how to make and use a switch with a different number of lines on each terminating end of the switch (i.e., R≠S≠T). Switch 901 can control all of the line pairs or merely a non-empty, proper subset of the line pairs. Switch 901 can provide connectivity between exchange-side line pairs and subscriber-side line pairs and auxiliary-side line pairs in every combination, or switch 901 can provide a non-exhaustive set of connectivity, depending on what the particular application requires. Switch 901 can be built based on micro-electromechanical system (i.e., MEMS) technology or other technology. It will be clear to those skilled in the art how to make and use switch 901, controlled by controller 902.

Controller 902 accepts control signals from the technician or from technician-controlled operations, administration, maintenance, and provisioning (OAM&P) equipment. The control signals are used to properly configure switch 901 via path 914. The technician and OAM&P equipment are presumably situated at a convenient, centralized location within or near local telecommunication network 100 (e.g., near central office 101, etc.). The OAM&P equipment can send control signals along a dedicated line pair (e.g., 911-1, etc.) that controller 902 knows is used for control signaling. Controller 902 is configured to monitor via path 915 the control signal traffic on the dedicated control signaling line pair. It will be clear to those skilled in the art how to create and use control signaling to be used by controller 902. It will be also clear to those skilled in the art how to provision a specific line pair or pairs to be used for carrying control signals and how to monitor for control signals. Alternatively, controller 902 can receive control signals from a dedicated path other than line pair 911-g. Path 916 represents a dedicated path for control signaling. Path 916 can be implemented with an interface such as RS-232. It will be clear to those skilled in the art how to make and use a separate path for carrying control signals.

Controller 902 can also pass control signals further along local telecommunication network 100. This is necessary if the control signal intercepted by controller 902 is not intended for switch 901. Another scenario is where controller 902 needs to coordinate an action with one or more additional switching modules. The control signal can be passed along via path 917 using an exchange side line pair dedicated for control signaling purposes (e.g., line pair 912-1, etc.) or via path 918 using an auxiliary-side line pair dedicated for control signaling purposes (e.g., line pair 913-1, etc.). Alternatively, the control signal can be passed along a separate control path, depicted in FIG. 9 as path 919. It will be also clear to those skilled in the art how to provision a specific line pair or pairs to be used for forwarding control signals. It will be clear to those skilled in the art how to make and use a separate control path for passing control signals.

Switch 901 and Controller 902 are nominally line-powered by one or more line pairs on the exchange side based on $-48V_{DC}$ voltage from central office 101. It will be clear to those skilled in the art how to line-power switch 901 and controller 902. Alternatively, switch 901 and controller 902 can draw power from a power supply local to host cross-connect 400. It will be clear to those skilled in the art how to power switch 901 and controller 902 locally.

Figure 10:
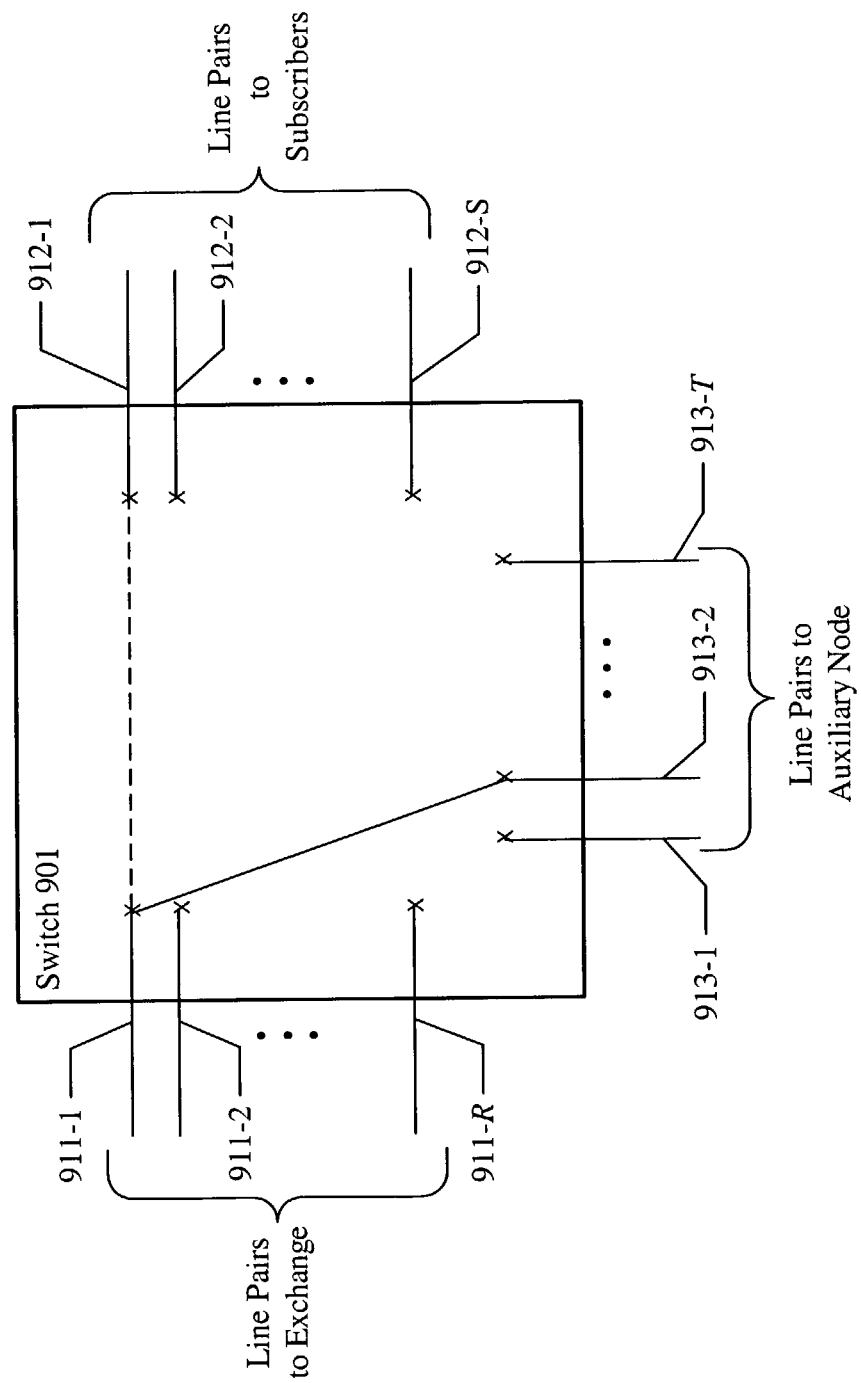
FIG. 10 depicts a block diagram of switch 901, as shown in FIG. 9, in accordance with the fourth mode of operation of the present invention.

FIG. 10 depicts the fourth mode of operation of the present invention. In the drawing, switch 901 initially has established a connection as shown by the dashed line between exchange-side line pair 911-1 and subscriber-side line pair 912-1. Upon receiving a command within a control signal, switch 901 reconfigures to connect line pair 911-1 to 913-2, an auxiliary-side line pair. This can apply to a situation where it is desirable to bypass line 912-1 by using other transmission lines (e.g., testing equipment, cascaded switches, etc.), which will be discussed later.

Figure 11:
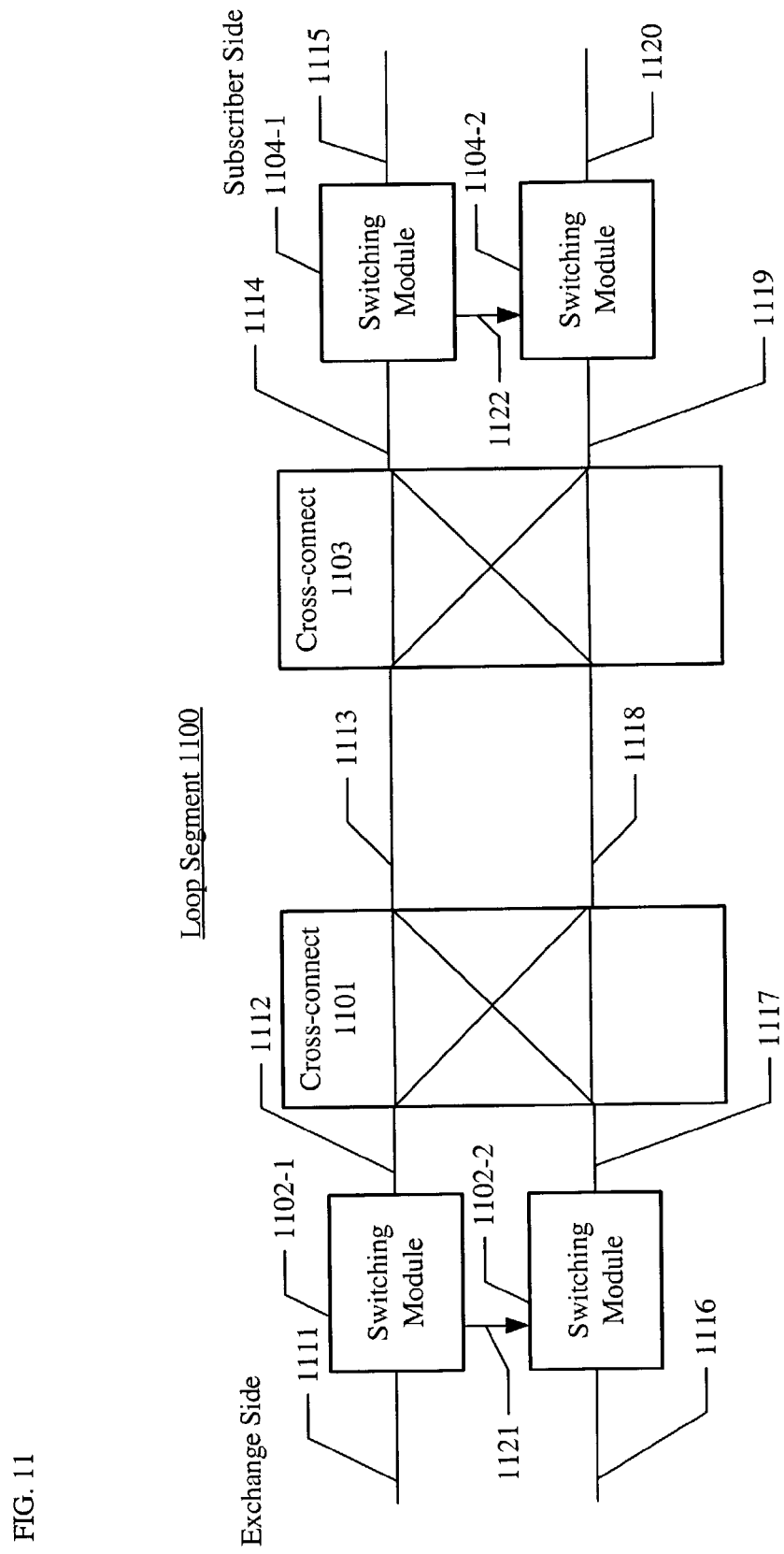
FIG. 11 depicts a block diagram of loop segment 1100 in accordance with the third illustrative embodiment of the present invention.

FIG. 11 depicts loop segment 1100 in an illustrative example, in which several switching modules are co-located with a plurality of cross-connects. Specifically, cross-connect 1101 hosts switching module 1102-1 and 1102-2. Cross-connect 1103 hosts switching module 1104-1 and 1104-2. There are multiple feeder cable runs spanning loop segment 1100. The first feeder run comprises cable 1111, 1112, 1113, 1114, and 1115, and provides a plurality of loop paths. The second feeder run comprises cable 1116, 1117, 1118, 1119, and 1120, and provides a plurality of loop paths. The span between cross-connect 1101 and cross-connect 1103 runs through a built up geographic area with other infrastructure present. It is possible that either cable 1113 or cable 1118 might be inadvertently damaged (e.g., by a backhoe digging a hole in the vicinity, etc.) Cable run diversity is typically used to divide up loop paths across multiple cable runs spanning the same area to guard against mishaps such as a cable being damaged. A number of spare line pairs are provided along each run to be activated if need. Therefore, there are loop paths running through cable 1111, 1112, 1118 (i.e., as opposed to 1113), 1114, and 1115. Likewise, there are loop paths running through 1116, 1117, 1113 (i.e., as opposed to 1118), 1119, and 1120. Cable run diversity is achieved by having the multiple cables between two end points running in different paths between the two end points.

In an illustrative example, suppose that cable 1113 is severed by a backhoe. The loop paths previously served by line pairs running through cable 1113 have to be reconfigured to use cable 1118. Without switching modules in place, a technician would have to manually reconfigure cross-connect 1101 and 1103 to establish loop paths through cable 1118. However, with switching module 1102-1 and 1104-1 in place, the reconfiguring of loop paths can be done at a convenient location and in a coordinated fashion, saving time and money, as well as minimizing error. Switch module 1102-1 is responsive to a control signal provided by cable 1111 from the provisioning equipment at central office 101. Switch module 1104-1 is responsive to a corresponding control signal provided by cable 1114. Control signal diversity through the span between cross-connect 1101 and 1103 is achieved by provisioning a line pair through each of cable 1113 and 1118 for control signal purposes.

In the event that cable 1118 were cut instead of cable 1113, switching module 1102-2 and 1104-2 would be used to reconfigure the loop paths. Switch module 1102-2 is responsive to a control signal provided by cable 1116 or by path 1121 from the provisioning equipment at central office 101. Switch module 1104-2 is responsive to a corresponding control signal provided by cable 1119 or by path 1122. Control signal diversity through the span between cross-connect 1101 and 1103 is achieved by provisioning a line pair through each of cable 1113 and 1118 for control signal purposes.

Figure 12:
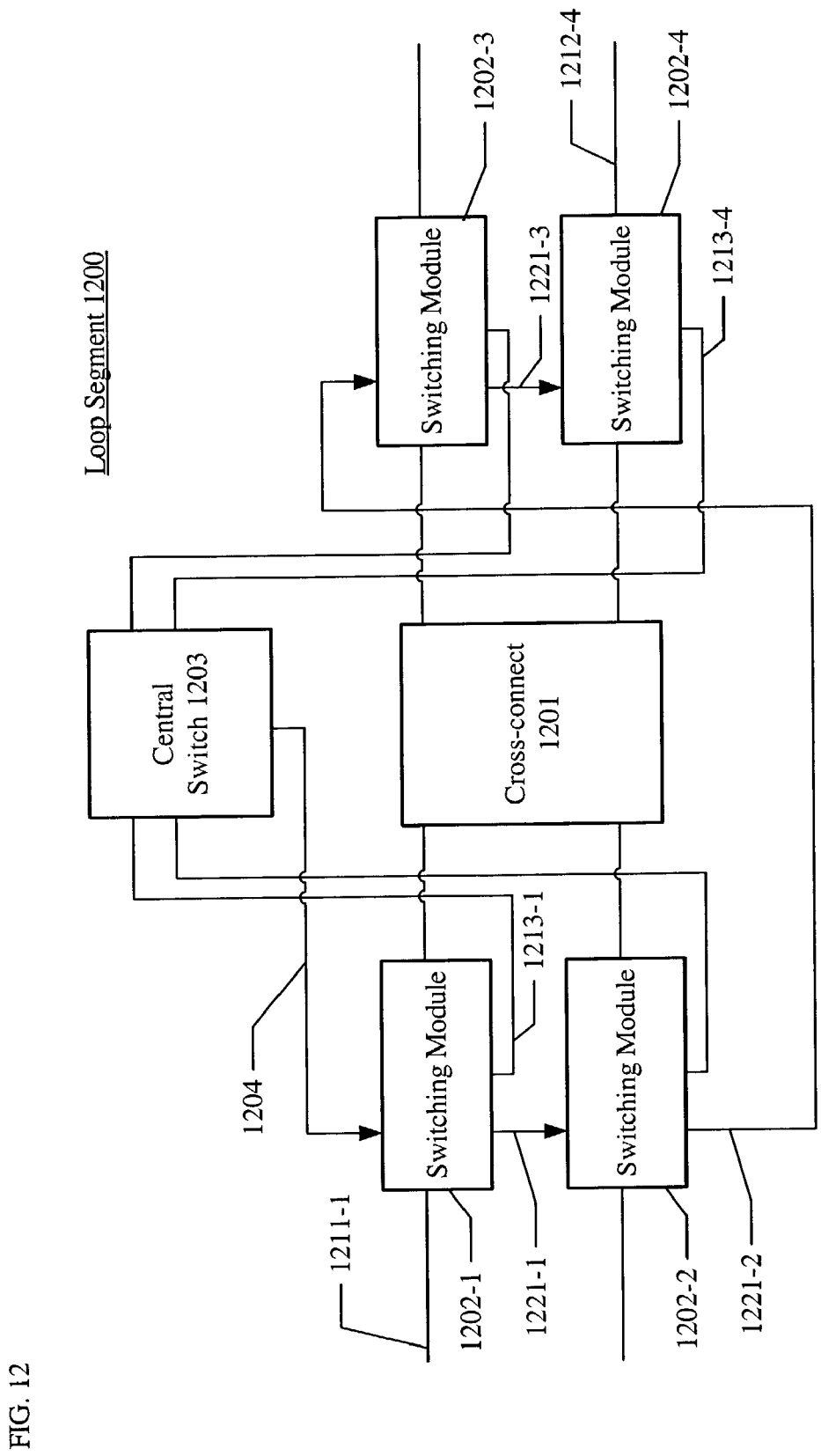
FIG. 12 depicts a block diagram of loop segment 1200 in accordance with the fourth illustrative embodiment of the present invention.

FIG. 12 depicts loop segment 1200 in another illustrative example, in which several switching modules, switching module 1202-1, 1202-2, 1202-3, and 1202-4 are connected to cross-connect 1201. The switching modules in the illustrative example have been installed individually over time, although they could have been installed at the same time without making a difference in the illustrative example. At some point in time, presumably when it makes sense to do so economically, operationally, and technically, central switch 1203 can be installed at cross-connect 1201. Central switch 1203 is networked into the array of switching modules associated with cross-connect 1201.

One purpose of the configuration depicted by FIG. 12 is to provide switching across pair units, as opposed to within each pair-unit. In an illustrative example, suppose that a line pair associated with exchange-side pair unit 1211-1 has to be connected to a line pair associated with subscriber-side pair unit 1212-4. Central switch 1203 sends a control signal via path 1204 to switching module 1202-1. Switching module 1202-1 then switches the exchange-side line pair of interest within pair unit 1211-1 to an unused pair unit associated with auxiliary-side pair unit 1213-1.

Meanwhile, switching module 1202-1 sends a corresponding control signal to switching module 1202-4 via control path 1221-1, 1221-2, and 1221-3. Switching module 1202-4 then switches the subscriber-side line pair of interest within pair unit 1212-4 to an unused pair unit associated with auxiliary-side pair unit 1213-4.

Central switch 1203 bridges the two selected auxiliary-side line pairs (i.e., associated with pair units 1213-1 and 1213-4) by establishing a connection between the selected line pairs. It will be clear to those skilled in the art how to make and use central switch 1203 for the purpose of reconfiguring local telecommunication system 100. Note that central switch 1203 in tandem with a complement of switching modules does not have to provide connectivity across all pair units associated with cross-connect 1201. Therefore, the configuration depicted in FIG. 12 addresses the economic and scalability issues associated with upgrading cross-connect 1201.

Figure 13:
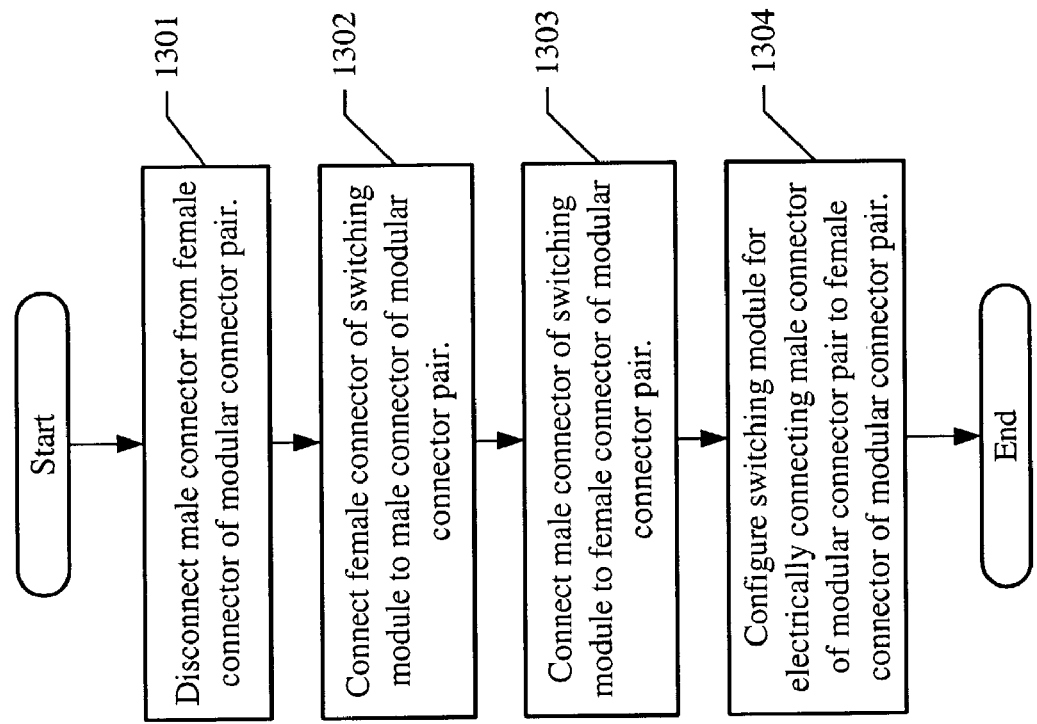
FIG. 13 depicts a flowchart of the tasks related to installing switching module 500-j, as shown in FIG. 5.

FIG. 13 depicts a flowchart of the tasks performed when introducing switching module 500-j to a cross-connect environment. It will be clear to those skilled in the art which of the tasks depicted in FIG. 13 can be performed simultaneously or in a different order than that depicted in FIG. 13.

At task 1301, the installer disconnects the male connector from the female connector of a modular connector pair. The modular connector pair is associated with a one or more line pairs constituting a pair unit that is connected to a cross-connect.

At task 1302, the installer connects the female connector of switching module 500-j to the male connector of the original modular connector pair.

At task 1303, the installer connects the male connector of switching module 500-j to the female connector of the original modular connector pair.

At task 1304, the installer configures switching module 500-j for electrically connecting the line pairs associated with the male connector of the original modular connector pair to line pairs associated with the female connector of the original modular connector pair. Initially, each male connector line pair is electrically connected via switching module 500-j to the corresponding female connector line pair to which the male connector line pair was originally connected prior to performing task 1301. However, the technician can immediately reconfigure the line pairs as the technician deems necessary or advantageous.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

The invention claimed is:

1. A telecommunications facility comprising:
   (1) a first cross-connect comprising a plurality of exchange-side line pairs;
   (2) a second cross-connect comprising a plurality of line-side line pairs;
   (3) a cable comprising a first plurality of cable line pairs;
   (4) a first switching module between said first cross-connect and said cable, said first switching module comprising:
      (a) a first N-pair modular connector for joining said plurality of exchange-side line pairs to a first plurality of first switching module line pairs;
      (b) a second N-pair modular connector for joining a second plurality of first switching module line pairs to said plurality of cable line pairs;
      (c) a controller responsive to a first control signal received through said first plurality of exchange-side line pairs for establishing switching configurations; and
      (d) a switch for establishing a correspondence between said first plurality of said first switching module pairs and said second plurality of first switching module pairs based on stimuli from said controller;
   (5) a second switching module between said cable and said second cross-connect, said second switching module comprising:
      (a) a first N-pair modular connector for joining said plurality of cable line pairs to a first plurality of second switching module line pairs;
      (b) a second N-pair modular connector for joining a second plurality of second switching module line pairs to said plurality of cable line pairs;
      (c) a controller responsive to a second first control signal received through said first plurality of cable line pairs for establishing switching configurations; and
      (d) a switch for establishing a correspondence between said first plurality of said second switching module pairs and said second plurality of second switching module pairs based on stimuli from said controller; wherein N is a positive integer.

2. The telecommunications facility of claim 1 wherein said controller transmits said second control signal through said cable line pairs ; and
   wherein said second control signal comprises information derived from said first control signal.

3. The telecommunications facility of claim 1 wherein said first switching module is powered through said first N-pair modular connector.

4. The telecommunications facility of claim 1 wherein said first switch comprises micro-electromechanical system components.

5. The telecommunications facility of claim 1 wherein said second switching module is powered through said first N-pair modular connector.

6. The telecommunications facility of claim 1 wherein said switch in said first switching module is configured symmetrically to said switch in said second switching module.

* * * * *